(12) United States Patent
Powers et al.

(10) Patent No.: US 10,671,284 B2
(45) Date of Patent: Jun. 2, 2020

(54) PLACEMENT AND MOVEMENT OF SUB-UNITS OF A STORAGE UNIT IN A TIERED STORAGE ENVIRONMENT

(71) Applicant: INTERNATIONAL BUSINESS MACHINES CORPORATION, Armonk, NY (US)

(72) Inventors: Bradley S. Powers, Tucson, AZ (US); Gail A. Spear, Tucson, AZ (US); Teena N. Werley, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/847,625

(22) Filed: Dec. 19, 2017

(65) Prior Publication Data

US 2018/0107393 A1  Apr. 19, 2018

Related U.S. Application Data

(63) Continuation of application No. 15/040,387, filed on Feb. 10, 2016, now Pat. No. 9,880,738, which is a continuation of application No. 14/153,868, filed on Jan. 13, 2014, now Pat. No. 9,298,373.

(51) Int. Cl.
*G06F 3/06* (2006.01)

(52) U.S. Cl.
CPC ............ *G06F 3/0604* (2013.01); *G06F 3/061* (2013.01); *G06F 3/0608* (2013.01); *G06F 3/0649* (2013.01); *G06F 3/0659* (2013.01); *G06F 3/0665* (2013.01); *G06F 3/0683* (2013.01); *G06F 3/0685* (2013.01); *G06F 3/0689* (2013.01)

(58) Field of Classification Search
CPC ...... G06F 3/0685; G06F 3/0649; G06F 3/061; G06F 3/0608; G06F 3/0665; G06F 3/0683; G06F 3/0689; G06F 3/0604; G06F 3/0659
USPC ........................................................ 711/117
See application file for complete search history.

(56) References Cited

U.S. PATENT DOCUMENTS

| | | | |
|---|---|---|---|
| 6,347,364 B1 | 2/2002 | Liedtke | |
| 6,718,445 B1 | 4/2004 | Lewis et al. | |
| 7,441,096 B2 * | 10/2008 | Kitamura | G06F 3/0605 711/161 |
| 7,831,793 B2 | 11/2010 | Chakravarty et al. | |
| 8,234,464 B2 * | 7/2012 | Bish | G06F 3/0605 162/155 |
| 8,407,398 B2 | 3/2013 | Hobbet et al. | |
| 8,700,853 B2 | 4/2014 | Ikegaya | |

(Continued)

OTHER PUBLICATIONS

J. Liedtke, et al., "How to Schedule Unlimited Memory Pinning of Untrusted Processes or Provisional Ideas About Service-Neutrality", IBM T.J. Watson Research Center. pp. 7.

(Continued)

*Primary Examiner* — Hua J Song
(74) *Attorney, Agent, or Firm* — Rabindranath Dutta; Konrad Raynes Davda & Victor LLP

(57) ABSTRACT

A storage controller configures a plurality of storage tiers. A sub-unit of a storage unit is maintained in a selected storage tier of the plurality of storage tiers, for at least a predetermined duration of time subsequent to an input/output (I/O) request for the sub-unit.

18 Claims, 7 Drawing Sheets

(56) References Cited

U.S. PATENT DOCUMENTS

| | | |
|---|---|---|
| 8,949,208 B1 | 2/2015 | Xu et al. |
| 2010/0070466 A1 | 3/2010 | Prahlad et al. |
| 2013/0124780 A1 | 5/2013 | Baderdinni et al. |
| 2015/0199131 A1 | 7/2015 | Powers et al. |
| 2015/0286413 A1 | 10/2015 | Olson et al. |
| 2015/0355860 A1* | 12/2015 | Candelaria ............ G06F 3/0622 711/112 |

OTHER PUBLICATIONS

Office Action dated Jul. 1, 2015, pp. 16, for U.S. Appl. No. 14/153,868, filed Jan. 13, 2014.
Response dated Oct. 1, 2015, pp. 12, to Office Action dated Jul. 1, 2015, pp. 16, for U.S. Appl. No. 14/153,868, filed Jan. 13, 2014.
Notice of Allowance dated Dec. 23, 2015, pp. 5, for U.S. Appl. No. 14/153,868, filed Jan. 13, 2014.
List of IBM Patents or Patent Applications Treated as Related, Dec. 19, 2017, Total 2 pp.
Office Action dated Jun. 14, 2017, pp. 13, for U.S. Appl. No. 15/040,387, filed Feb. 10, 2016.
Response dated Aug. 31, 2017, pp. 8, to Office Action dated Jun. 14, 2017, pp. 8, for U.S. Appl. No. 15/040,387, filed Feb. 10, 2016.
Notice of Allowance dated Sep. 21, 2017, pp. 5, for U.S. Appl. No. 15/040,387, filed Feb. 10, 2016.

* cited by examiner

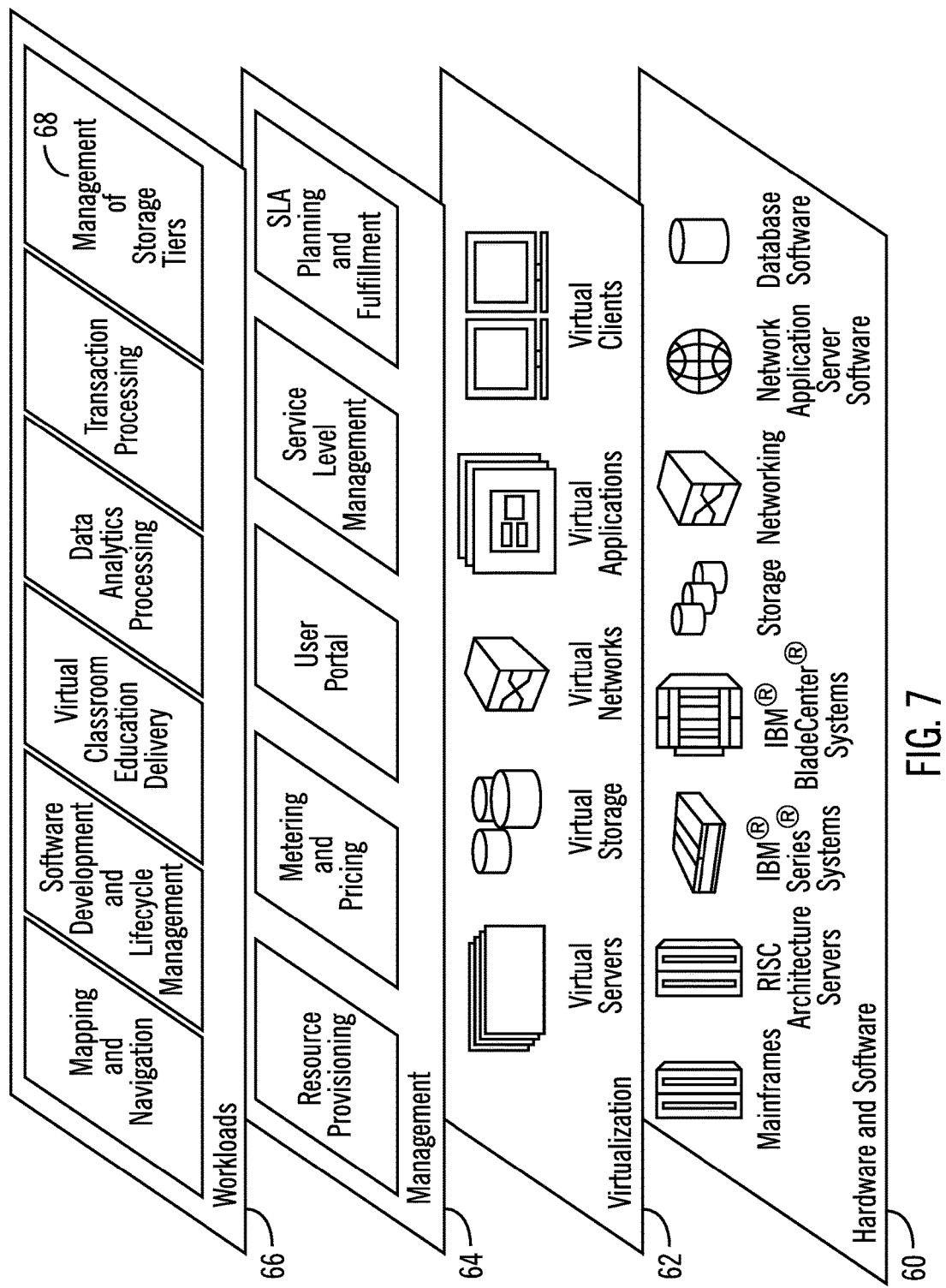

PLACEMENT AND MOVEMENT OF SUB-UNITS OF A STORAGE UNIT IN A TIERED STORAGE ENVIRONMENT

CROSS-REFERENCE TO RELATED APPLICATIONS

This application is a continuation of application Ser. No. 15/040,387 filed on Feb. 10, 2016, wherein application Ser. No. 15/040,387 is a continuation of application Ser. No. 14/153,868 filed on Jan. 13, 2014, and wherein application Ser. Nos. 15/040,387 and 14/153,868 are incorporated herein by reference in their entirety.

BACKGROUND

1. Field

Embodiments relate to the placement and movement of sub-units of a storage unit in a tiered storage environment.

2. Background

In a tiered storage environment different categories of data may be assigned to different types of storage media in order to reduce total storage cost. The categories may be based on performance requirements, frequency of use, the volume of data, access density, and other considerations. For example, recently or more frequently accessed data or data that is expected to be used within the next few minutes may be stored on Tier-1 storage such as solid state disks (SSD), where SSDs are relatively expensive per unit of storage but have high performance characteristics. Data that is currently being used or expected to be used within the next few days may be stored on Tier-2 storage that includes less expensive media such as enterprise drives. Data that is unlikely to be used within the next few days may be stored in Tier-3 storage that includes still less expensive media such as nearline drives. Nearline storage (where the word "nearline" is a contraction of near-online) is a term used in computer science to describe an intermediate type of data storage that represents a compromise between online storage (supporting frequent, very rapid access to data) and offline storage/archiving (used for backups or long-term storage, with infrequent access to data). It may be noted that, tiering is not just for data that is expected to be used or not expected to be used within the next few days and it may also be based on access density. For example, if two pieces of data are both used every day (maybe even every hour), but the Input/Output (I/O) per second is very high on one, and very low on the other, then the higher Input/Output per second data may be moved to tier-1 but the lower Input/Output per second data may not be moved.

A storage controller may control storage volumes storage in a tiered storage environment. The storage controller may receive input/output (I/O) commands from a host computing device coupled to the storage controller, and provide access to the data storage in the tiered storage environment to the host computing device.

SUMMARY OF THE PREFERRED EMBODIMENTS

Provided are a method, a system, and a computer program product in which a storage controller configures a plurality of storage tiers. A sub-unit of a storage unit is maintained in a selected storage tier of the plurality of storage tiers, for at least a predetermined duration of time subsequent to an input/output (I/O) request for the sub-unit.

In certain embodiments, the sub-unit is eligible for movement to another storage tier of the plurality of storage tiers subsequent to expiry of the predetermined duration of time.

In additional embodiments, the maintaining of the sub-unit in the selected storage tier is performed in response to a user indication that the sub-unit is to be pinned to the selected storage tier or in response to a default selection.

In further embodiments, the storage unit is a storage volume and the sub-unit is an extent, where the storage volume comprises a plurality of extents.

In certain embodiments, the plurality of storage tiers are configured to store a plurality of storage units and storage sub-units. The plurality of storage tiers comprise a first storage tier and a second storage tier, where the first storage tier has a higher performance but lower storage capacity than the second storage tier.

In additional embodiments, the plurality of storage tiers comprise a third storage tier in addition to the first storage tier and the second storage tier, where the second storage tier has a higher performance but lower storage capacity than the third storage tier.

In yet additional embodiments, the first storage tier is comprised of solid state disks (SSD), the second storage tier is comprised of enterprise drives, the third storage tier is comprised of nearline drives, and the selected storage tier is the second storage tier.

BRIEF DESCRIPTION OF THE DRAWINGS

Referring now to the drawings in which like reference numbers represent corresponding parts throughout:

FIG. 7 illustrates a block diagram of further details of the cloud computing environment of FIG. 6, in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made.

In certain embodiments, a storage controller configures a plurality of storage tiers where the storage controller manages movements of data sets across the plurality of storage tiers for system efficiency. A user indicates a storage tier to which a newly created storage unit (e.g., a volume) is to be pinned (i.e. maintained without moving to another storage tier). In certain embodiments, a sub-unit (e.g., an extent) of a storage unit (e.g., a volume) is maintained in the storage tier to which the storage unit is pinned, for at least a predetermined duration of time subsequent to an input/output (I/O) request for the sub-unit.

Exemplary Embodiments

Figure 1:
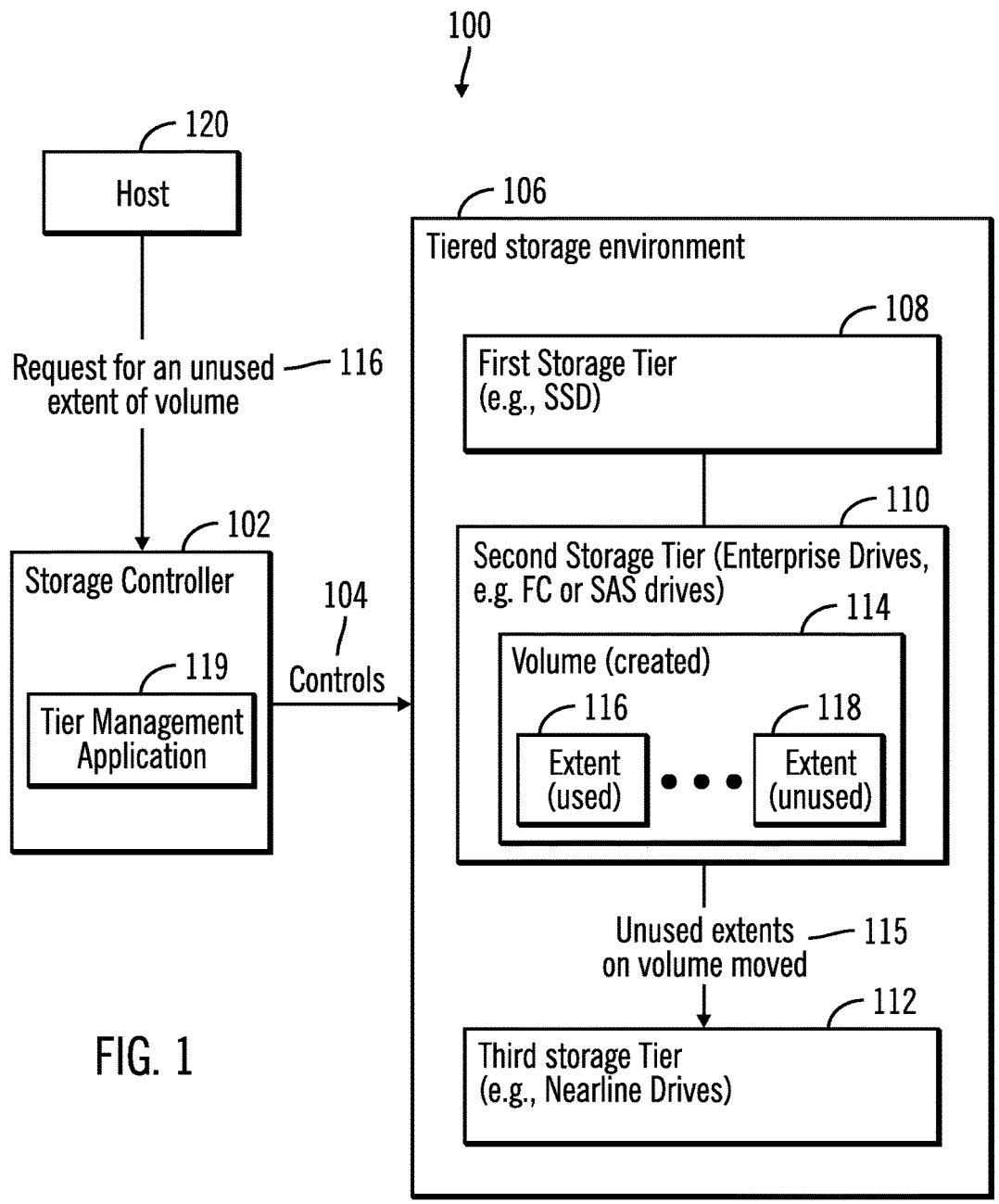
FIG. 1 illustrates a block diagram of a first computing environment, in accordance with certain embodiments.

FIG. 1 illustrates a block diagram of a first computing environment 100, in accordance with certain embodiments.

In FIG. 1, a storage controller 102 controls (shown via reference numeral 104) a tiered storage environment 106, where the tiered storage environment 106 includes a first storage tier 108, a second storage tier 110, and a third storage tier 112. In certain embodiments, the first storage tier 108 is comprised of solid state disks, the second storage tier 110 is comprised of enterprise drives, such as fibre channel (FC) or Serial Attached SCSI (SAS) drives in the 10-15K RPM (rotations per minute) range, and the third storage tier 112 comprises nearline drives with higher capacity but slower RPM (e.g., 7200 RPM) drives in comparison to the enterprise drives. It should be noted that the types of storage devices stored in the different storage tiers may be different in alternative embodiments. In certain embodiments, the first storage tier 108 has a higher performance but lower storage capacity than the second storage tier 110, and the second storage tier 110 has a higher performance but lower storage capacity than the third storage tier 112. In alternative embodiments, instead of three storage tiers 108, 110, 112 there may be two storage tiers or more than three storage tiers.

In certain embodiments, data storage units may be represented as volumes, and the volumes may store data in the tiered storage environment 106 that is controlled by the storage controller 104. In certain storage units there may be sub-units. For example, a volume 114 may be comprised of a plurality of extents 116, 118 as shown in FIG. 1.

In certain embodiments, the storage controller 102 may execute a tier management application 119 which configures the storage units of the storage tiers 108, 110, 112 and ensures that storage units and sub-units of the storage units are moved from tier to tier in a manner such that storage capacity is used efficiently while also maintaining good performance characteristics.

In certain embodiments, the tier management application 119 may initially place a newly created volume in the second storage tier 110. However, after a period of time the tier management application 119 may determine that is better to move an unused extent 118 to the third storage tier 112, and moves the volume's unused extent 118 to the third storage tier 112 (shown via reference numeral 115).

Subsequent to the movement of the unused extent 118 to the third storage tier 112, a host 120 may request I/O operations with respect to the unused extent 118 (shown via reference numeral 116) which is now located in the relatively slower responding third tier 112 (in comparison to the second tier 110). In such situations, it would have been better if the unused extent 118 had been retained in the second storage tier 110 rather than being moved to the third storage tier 112.

Under such conditions, datasets stored on extent 118 may start out with poor performance and may stay that way for many hours or days until the tier management application 118 determines that the extent 118 needs to be moved to a higher performing tier (e.g., second storage tier 110) tier and move the extent 118 back to the second tier 110 from the third storage tier 112.

Therefore, FIG. 1 illustrates certain embodiments in which there is inefficient usage of the tiered storage environment 106. Certain embodiments attempt to provide a mechanism that avoids such inefficient usage of the tiered storage environment 106. While FIG. 1 shows three tiers, in alternative embodiments there may be two or more than three tier. There may be any number of defined tiers with ranked distinguishing performance characteristics. The embodiments may be implemented in any situation where there are two or more tiers.

Figure 2:
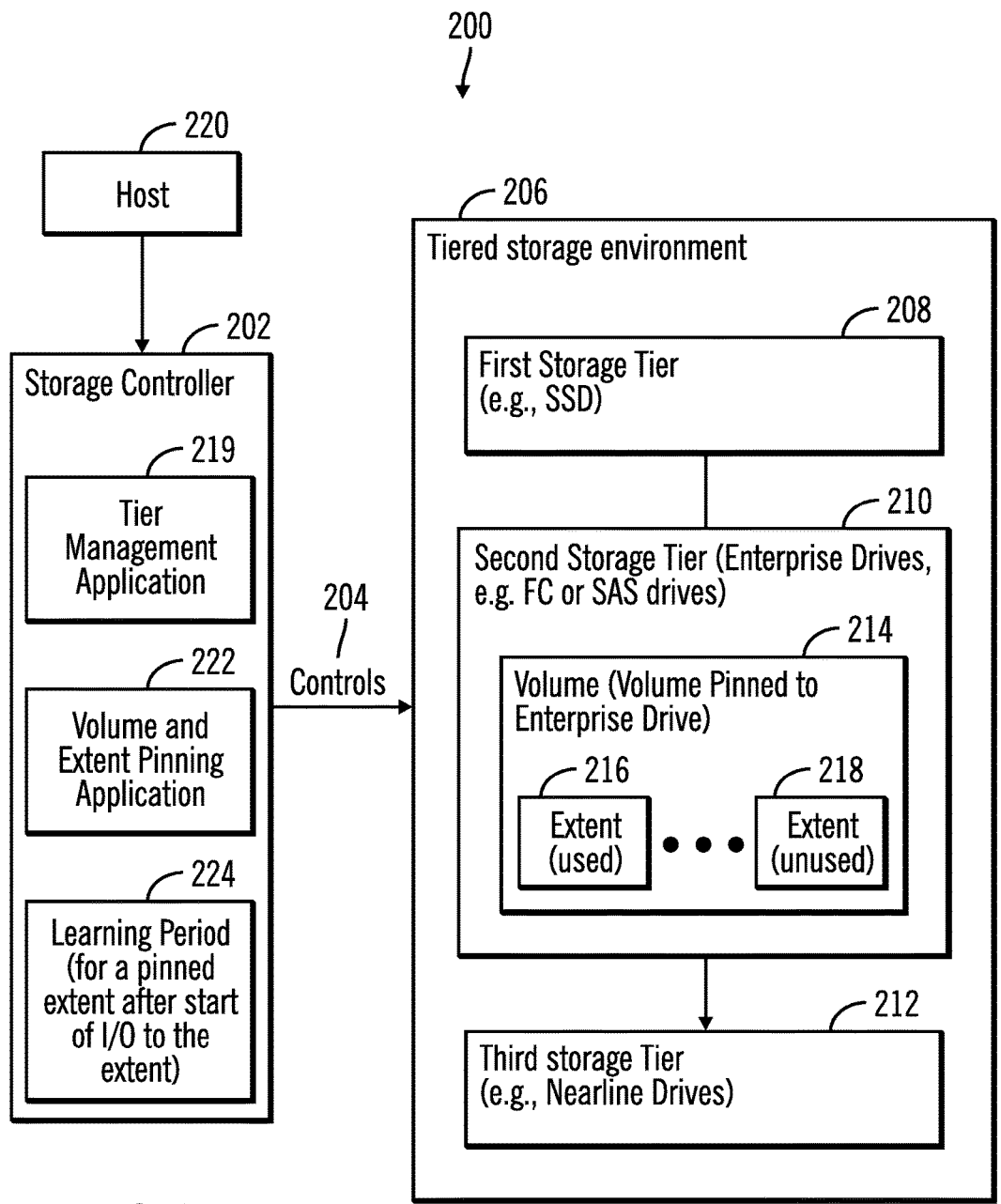
FIG. 2 illustrates a block diagram of a second computing environment, in accordance with certain embodiments.

FIG. 2 illustrates a block diagram of a second computing environment 200, in accordance with certain embodiments.

In FIG. 2, a host 220 is coupled to a storage controller 202 that controls (reference numeral 204) a tiered storage environment 206 comprised of a first storage tier 208, a second storage tier 210, and a third storage tier 212. In certain embodiments the first storage tier 208 has a higher performance but lower storage capacity than the second storage tier 210, and the second storage tier 210 has a higher performance but lower storage capacity than the third storage tier 212. In alternative embodiments, instead of three storage tiers 208, 210, 212 there may be two storage tiers or more than three storage tiers.

In FIG. 2 (and also correspondingly in FIG. 1) the storage controller 202 and the host 220 may comprise any suitable computational device presently known in the art, such as, a personal computer, a workstation, a server, a mainframe, a hand held computer, a palm top computer, a telephony device, a network appliance, a blade computer, a server, etc. The host 220, the storage controller 202, and the tiered storage environment 206 may be included in a suitable network, such as a storage area network, a wide area network, the Internet, an intranet, etc., and/or in a cloud computing environment.

The storage controller 202 includes a tier management application 219, a volume and extent pinning application 222, and a data structure that stores a learning period 224 for an extent that has been pinned (restricted from being moved from one storage tier to another). In certain embodiments, the tier management application 219 and the volume and extent pinning application 222 may be implemented in software, firmware, hardware or any combination thereof. In certain embodiments the operations performed by the tier management application 219 and the volume and extent pinning application 222 may be implemented in a single application.

In certain embodiments, in response to the creation of volume 214, the volume and extent pinning application 222 pins the volume 214 such that extents 216, 218 are restricted from being moved from the second storage tier 210 to any other storage tier. On receipt of an I/O operation for an unused extent from the host 220, the volume and extent pinning application 222 starts a timer, and until the timer attains the value indicated by the learning period 224 the volume and extent pinning application 222 prevents the extent 218 from being moved to another storage tier. If the timer attains the value of the learning period 224 (i.e., the unused extent after receiving I/O has at least spent the time indicated by the learning period 224 in the second storage tier 210), then the volume and extent pinning application 222 allows the tier management application 219 to assume control of the movement of the extent 218 (which is now used), to a different storage tier.

Therefore, FIG. 2 illustrates certain embodiments in which by pinning an extent to an appropriate storage tier for the duration of the learning period 224 after the receipt of an I/O for the extent, system performance is increased over the situation described in FIG. 1 where an unused extent may have been moved to a lower performing storage prior to an arrival of an I/O for the unused extent. It should be noted that in FIG. 2, the appropriate storage tier has been shown as the second storage tier 210 but in other embodiments a different storage tier may correspond to the appropriate storage tier.

Figure 3:
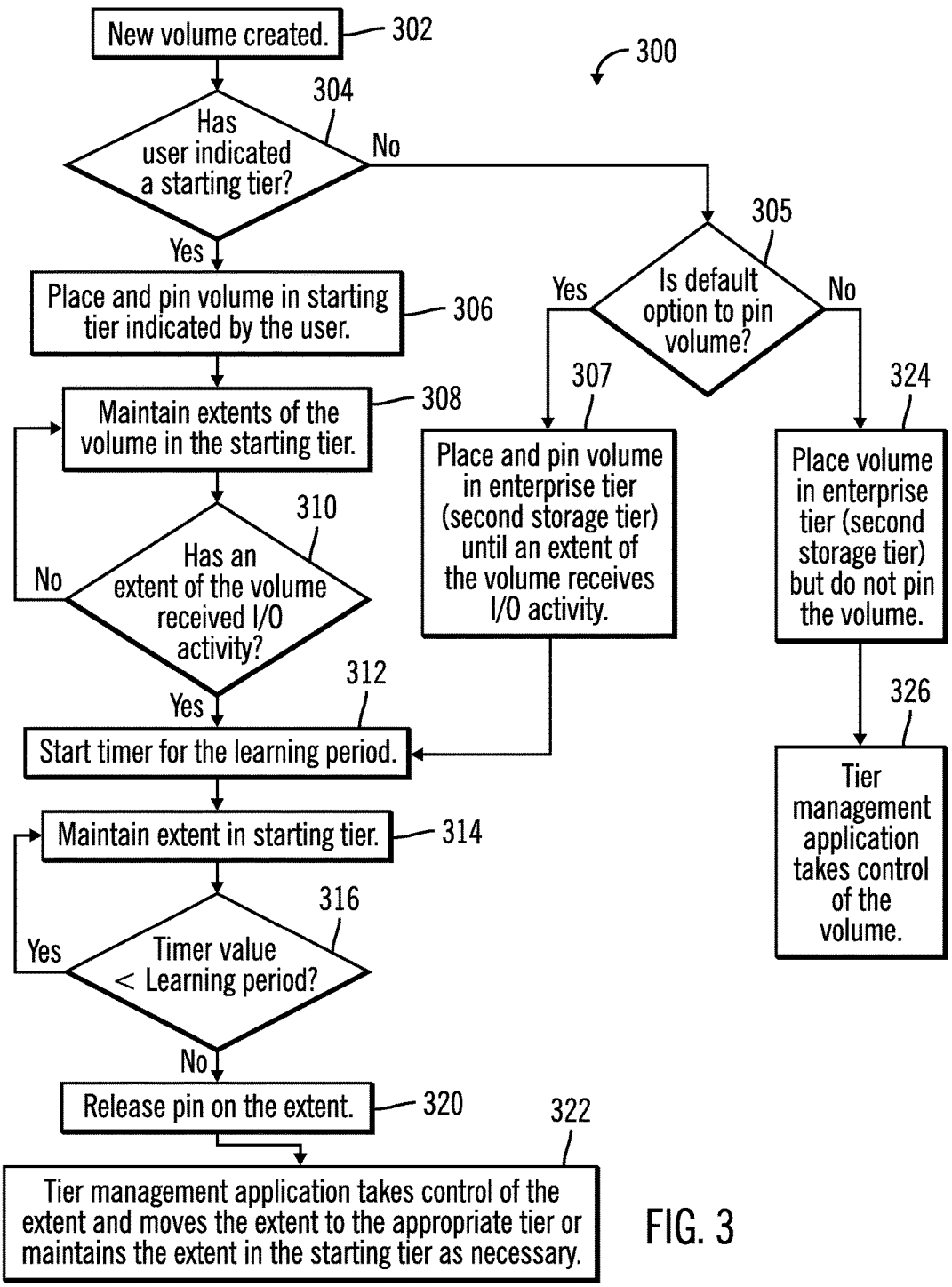
FIG. 3 illustrates a first flowchart that shows first operations performed for the placement and movement of sub-units of a storage unit in a tiered storage environment, in accordance with certain embodiments.

FIG. 3 illustrates a first flowchart 300 that shows first operations performed for the placement and movement of sub-units of a storage unit in a tiered storage environment 206, in accordance with certain embodiments. The operations shown in FIG. 3 may be performed by the storage controller 202 in which the volume and extent pinning application 222 and the tier management application 219 executes, or by one or more applications that integrate the functions performed by the volume and extent pinning application 222 and the tier management application 219.

Control starts at block 302 in which the storage controller 202 creates a new volume and then the volume and extent pinning application 222 determines (at block 304) whether a user has indicated a starting tier (i.e., a storage tier in which the new volume is to be placed at first). If so, then the volume and extent pinning application 222 places and pins (at block 308) the new volume in the starting tier indicated by the user. For example, in FIG. 2 the starting tier may be the second storage tier 210, and the new storage volume 214 is placed in the second storage tier 214. The extents 216, 218 of the new storage volume are maintained in the starting storage tier (the second storage tier) 214.

Control proceeds to block 310 in which the volume and extent pinning application 222 determines whether an extent (e.g., extent 216, 218) has received I/O activity, i.e., whether the host 220 has requested I/O with respect to the extent. If so, then a timer is started (at block 312) for the learning period 224, and the extent continues to be maintained (at block 314) in the starting tier 210.

Control proceeds to block 316 in which volume and extent pinning application 222 determines whether the timer value is less than the learning period 224. If not, then the timer expires and the volume and extent pinning application 222 releases (at block 320) the pin on the extent. Control proceeds to block 322 where the tier management application 219 takes control of the extent and moves the extent to the appropriate tier or maintains the extent in the starting tier as necessary.

If at block 310, it is determined that the extent of the volume has not received I/O activity then control returns to block 308 ("No" branch from block 310). If at block 316, it is determined that the timer value is less than the learning period then control returns to block 314 ("Yes" branch from block 316).

If at block 304, it is determined that the user has not indicated ("No" branch from block 304) a starting tier, then control proceeds to block 305 where a determination is made as to whether the default option is to pin a volume. If so, then the new volume is placed and pinned in the second storage tier (i.e., enterprise drive based tier) until an extent of the new volume receives I/O activity (at block 307), and then control proceeds to block 312. If at block 305 a determination is made that the default option is not to pin a volume, then the new volume is placed (at block 324) in the second storage tier (i.e., the enterprise drive based tier) and the tier management application 219 takes control (at block 326) of the management of the volume and moves the volume as necessary to higher or lower tiers or continues to maintain the volume in the second storage tier 210.

Therefore, FIG. 3 illustrates certain embodiments where as a default (i.e., when a user does not indicate where to place and pin a new volume) a new volume is placed in the second storage tier 210 without being pinned. If the user indicates a starting tier (e.g., the first storage tier 208, second storage tier 210, or third storage tier 212) then the new volume is placed and pinned in the indicted starting tier, and an extent of the new volume is maintained in the starting tier for a least the duration indicted by the learning period 224 after the first I/O with respect to the extent.

Figure 4:
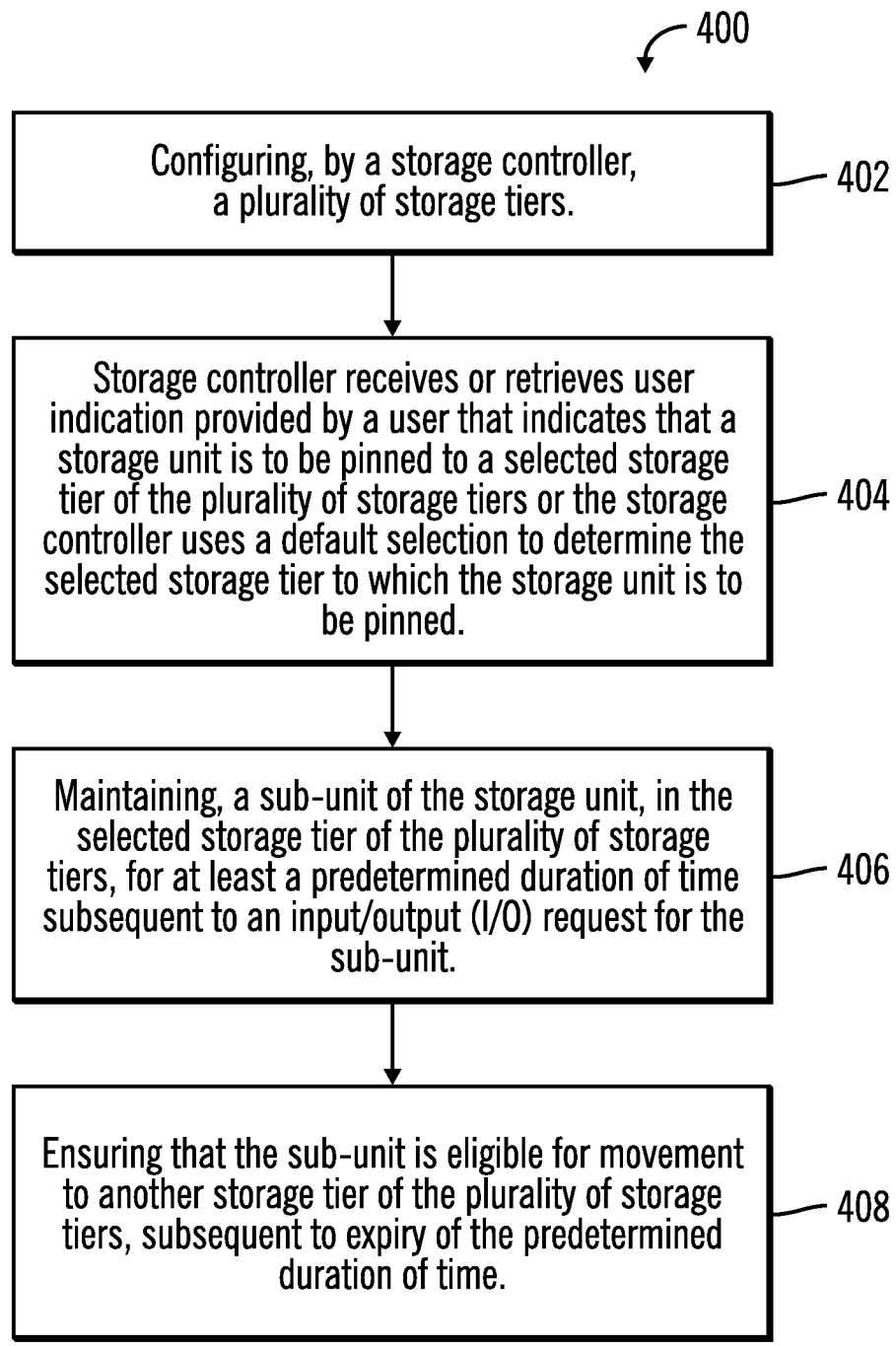
FIG. 4 illustrates a second flowchart that shows second operations performed for the placement and movement of sub-units of a storage unit in a tiered storage environment, in accordance with certain embodiments.

FIG. 4 illustrates a second flowchart 400 that shows first operations performed for the placement and movement of sub-units of a storage unit in a tiered storage environment, in accordance with certain embodiments. The operations shown in FIG. 4 may be performed by the storage controller 202 in which the volume and extent pinning application 222 and the tier management application 219 executes, or by one or more applications that integrate the functions performed by the volume and extent pinning application 222 and the tier management application 219.

Control starts at block 402 in which the storage controller configures a plurality of storage tiers 208, 210, 212. The storage controller 202 receives or retrieves user indication provided by a user that indicates that a storage unit (e.g., a volume) is to be pinned to a selected storage tier (e.g., second storage tier 210) of the plurality of storage tiers 208, 210, 212 or the storage controller uses a default selection to determine the selected storage tier to which the storage unit is to be pinned.

The storage controller 202 maintains (at block 406) a sub-unit (e.g., an extent) of the storage unit, in the selected storage tier of the plurality of storage tiers 208, 210, 212, for at least a predetermined duration of time (e.g., the learning period 224) subsequent to an input/output (I/O) request for the sub-unit. Control proceeds to block 408 in which the storage controller 202 ensures that the sub-unit is eligible for movement to another storage tier of the plurality of storage tiers, subsequent to expiry of the predetermined duration of time 224 (e.g., the learning period).

Therefore, FIGS. 1-4 illustrate certain embodiments in which a storage controller pins a new volume to a specified storage tier indicated by a user. An extent of the volume is maintained in the specified storage tier at least until the expiry of a learning period that is measured after the arrival of the first I/O intended for the extent.

Certain embodiments shown in FIG. 2 enhances the performance of a tiered storage environment, in comparison to embodiments shown in FIG. 1 by allowing the pinning of extents based on a learning period and the arrival of first I/O operations with respect to the extents.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
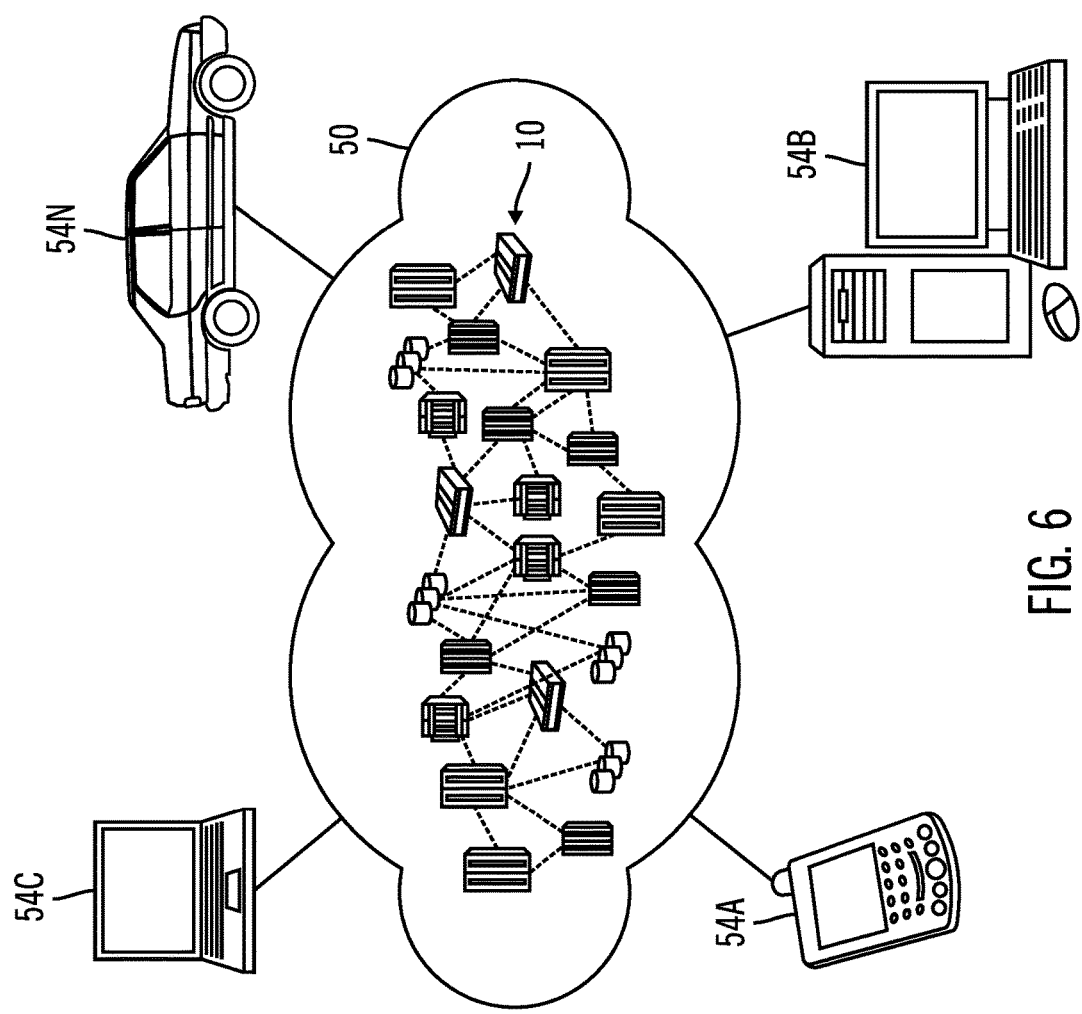
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and management of storage tiers in a computing environment 206 as shown in FIGS. 2-4.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java, JavaScript are trademarks or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
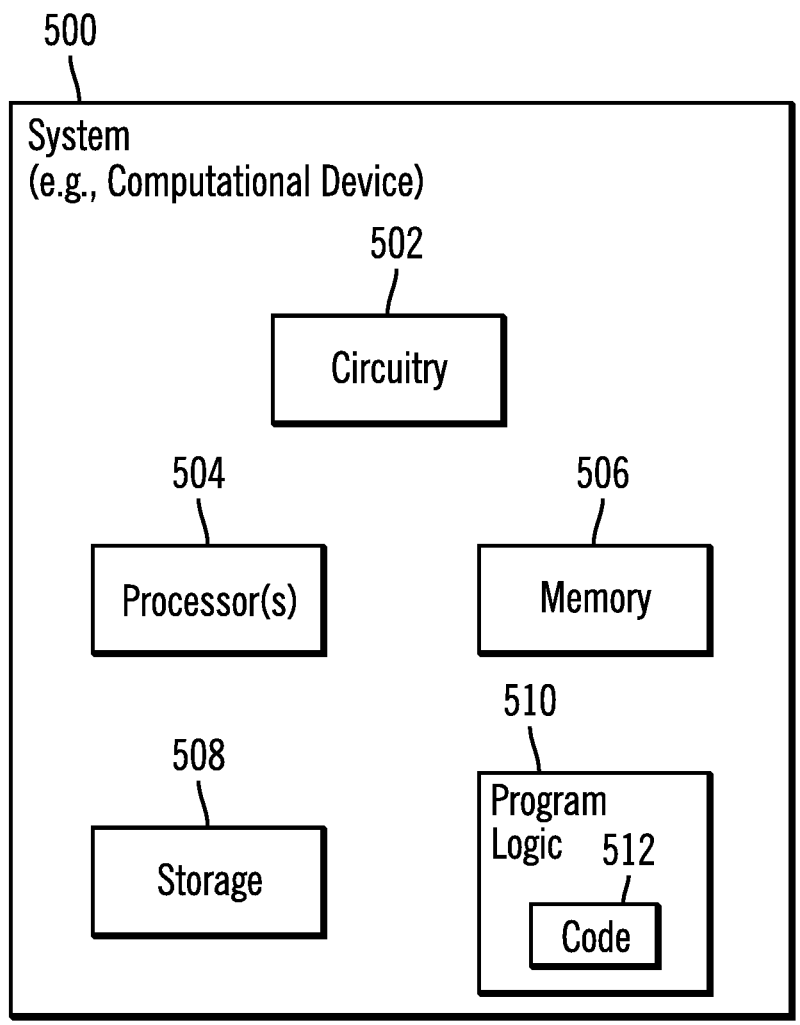
FIG. 5 illustrates a block diagram of a computational system that shows certain elements that may be included in the storage controller or the host of FIGS. 1 and 2, in accordance with certain embodiments.

FIG. 5 illustrates a block diagram that shows certain elements that may be included in the storage controller 202 or host 220 in accordance with certain embodiments. The system 500 (e.g., a computational device, such as the storage controller 202 and/or the host 220) may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
in response to creation of a storage unit, determining, by an application, whether a starting storage tier of a plurality of storage tiers has been indicated for the storage unit;
in response to determining that a starting tier has been indicated for the storage unit pinning the storage unit including a sub-unit of the storage unit, to the starting storage tier and maintaining the sub-unit of the storage unit in the starting storage tier, for at least a predetermined duration of time subsequent to an input/output (I/O) request for the sub-unit; and
in response to determining that a starting tier has not been indicated for the storage unit and a default option is to pin the storage unit, pining the storage unit including the sub-unit to a predetermined storage tier of the plurality of storage tiers, and maintaining the sub-unit of the storage unit in the predetermined storage tier, for at least the predetermined duration of time subsequent to the I/O request for the sub-unit.

2. The method of claim 1, wherein the application is a first application, wherein the starting or predetermined storage tier is a selected storage tier, and wherein the method further comprises:
in response to expiry of the predetermined duration of time, releasing, by the first application, the pinning of the sub-unit to the selected storage tier, to make the sub-unit eligible for movement to other storage tiers of the plurality of storage tiers.

3. The method of claim 1, wherein the application is a first application, wherein the starting or predetermined storage tier is a selected storage tier, and wherein the method further comprises:
in response to a releasing by the first application of the pinning of the sub-unit to the selected storage tier, taking control, by a second application, of management of the sub-unit, wherein the second application moves the sub-unit to an appropriate storage tier of the plurality of storage tiers.

4. The method of claim 1, wherein the application is a first application, wherein the starting or predetermined storage tier is a selected storage tier, and wherein the method further comprises:
in response to a releasing by the first application of the pinning of the sub-unit to the selected storage tier, taking control, by a second application, of management of the sub-unit, wherein the second application continues to maintain the sub-unit in the selected storage tier.

5. The method of claim 1, wherein the sub-unit is eligible for movement to another storage tier of the plurality of storage tiers subsequent to expiry of the predetermined duration of time.

6. The method of claim 1, wherein the application is a first application, and wherein the method further comprises:
in response to determining that a starting tier has not been indicated for the storage unit and that there is no default option to pin the storage unit, placing the storage unit in the predetermined storage tier without pinning the storage unit, wherein a second application that is a tier management application takes control of the movement of the storage unit among the plurality of storage tiers.

7. A system, comprising:
a memory; and
a processor coupled to the memory, wherein the processor performs operations, the operations comprising:
in response to creation of a storage unit, determining, by an application, whether a starting storage tier of a plurality of storage tiers has been indicated for the storage unit;
in response to determining that a starting tier has been indicated for the storage unit, pinning the storage unit including a sub-unit of the storage unit, to the starting storage tier and maintaining the sub-unit of the storage unit in the starting storage tier, for at least a predetermined duration of time subsequent to an input/output (I/O) request for the sub-unit; and
in response to determining that a starting tier has not been indicated for the storage unit and a default option is to pin the storage unit, pining the storage unit including the sub-unit to a predetermined storage tier of the plurality of storage tiers, and maintaining the sub-unit of the storage unit in the predetermined storage tier, for at least the predetermined duration of time subsequent to the I/O request for the sub-unit.

8. The system of claim 7, wherein the application is a first application, wherein the starting or predetermined storage tier is a selected storage tier, and wherein the operations further comprise:
in response to expiry of the predetermined duration of time, releasing, by the first application, the pinning of the sub-unit to the selected storage tier, to make the sub-unit eligible for movement to other storage tiers of the plurality of storage tiers.

9. The system of claim 7, wherein the application is a first application, wherein the starting or predetermined storage tier is a selected storage tier, and wherein the operations further comprise:
in response to a releasing by the first application of the pinning of the sub-unit to the selected storage tier, taking control, by a second application, of management of the sub-unit, wherein the second application moves the sub-unit to an appropriate storage tier of the plurality of storage tiers.

10. The system of claim 7, wherein the application is a first application, wherein the starting or predetermined storage tier is a selected storage tier, and wherein the operations further comprise:
in response to a releasing by the first application of the pinning of the sub-unit to the selected storage tier, taking control, by a second application, of management of the sub-unit, wherein the second application continues to maintain the sub-unit in the selected storage tier.

11. The system of claim 7, wherein the sub-unit is eligible for movement to another storage tier of the plurality of storage tiers subsequent to expiry of the predetermined duration of time.

12. The system of claim 7, wherein the application is a first application, and wherein the operations further comprise:
in response to determining that a starting tier has not been indicated for the storage unit and that there is no default option to pin the storage unit, placing the storage unit in the predetermined storage tier without pinning the storage unit, wherein a second application that is a tier management application takes control of the movement of the storage unit among the plurality of storage tiers.

13. A computer program product, the computer program product comprising a non-transitory computer readable storage medium having computer readable program code embodied therewith, the computer readable program code configured to perform operations on a processor, the operations comprising:

in response to creation of a storage unit, determining, by an application, whether a starting storage tier of a plurality of storage tiers has been indicated for the storage unit;

in response to determining that a starting tier has been indicated for the storage unit, pinning the storage unit including a sub-unit of the storage unit, to the starting storage tier and maintaining the sub-unit of the storage unit in the starting storage tier, for at least a predetermined duration of time subsequent to an input/output (I/O) request for the sub-unit; and in response to determining that a starting tier has not been indicated for the storage unit and a default option is to pin the storage unit, pining the storage unit including the sub-unit to a predetermined storage tier of the plurality of storage tiers, and maintaining the sub-unit of the storage unit in the predetermined storage tier, for at least the predetermined duration of time subsequent to the I/O request for the sub-unit.

14. The computer program product of claim 13, wherein the application is a first application, wherein the starting or predetermined storage tier is a selected storage tier, and wherein the operations further comprise:

in response to expiry of the predetermined duration of time, releasing, by the first application, the pinning of the sub-unit to the selected storage tier, to make the sub-unit eligible for movement to other storage tiers of the plurality of storage tiers.

15. The computer program product of claim 13, wherein the application is a first application, wherein the starting or predetermined storage tier is a selected storage tier, and wherein the operations further comprise:

in response to a releasing by the first application of the pinning of the sub-unit to the selected storage tier, taking control, by a second application, of management of the sub-unit, wherein the second application moves the sub-unit to an appropriate storage tier of the plurality of storage tiers.

16. The computer program product of claim 13, wherein the application is a first application, wherein the starting or predetermined storage tier is a selected storage tier, and wherein the operations further comprise:

in response to a releasing by the first application of the pinning of the sub-unit to the selected storage tier, taking control, by a second application, of management of the sub-unit, wherein the second application continues to maintain the sub-unit in the selected storage tier.

17. The computer program product of claim 13, wherein the sub-unit is eligible for movement to another storage tier of the plurality of storage tiers subsequent to expiry of the predetermined duration of time.

18. The computer program product of claim 13, wherein the application is a first application, and wherein the operations further comprise:

in response to determining that a starting tier has not been indicated for the storage unit and that there is no default option to pin the storage unit, placing the storage unit in the predetermined storage tier without pinning the storage unit, wherein a second application that is a tier management application takes control of the movement of the storage unit among the plurality of storage tiers.

* * * * *